United States Patent
Richards et al.

(10) Patent No.: US 11,204,856 B2
(45) Date of Patent: Dec. 21, 2021

(54) ADAPTIVE PERFORMANCE CALIBRATION FOR CODE

(71) Applicant: International Business Machines Corporation, Armonk, NY (US)

(72) Inventors: Michael Owen Richards, Fredericton (CA); Michael S. Hume, Fredericton (CA); Christopher Ian Collins, Fredericton (CA); Bradley Joel Bergeron, Fredericton (CA); Manisha Gupta, Brampton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 16/252,566

(22) Filed: Jan. 18, 2019

(65) Prior Publication Data
US 2020/0233776 A1    Jul. 23, 2020

(51) Int. Cl.
*G06F 11/36* (2006.01)
(52) U.S. Cl.
CPC .................. *G06F 11/3608* (2013.01)
(58) Field of Classification Search
CPC ............. G06F 11/3688; G06F 11/3608; G06F 11/3664; G06F 8/71; G06F 11/3684; G06N 20/00; G06N 7/005; H04L 43/05; G01R 31/3177
See application file for complete search history.

(56) References Cited

U.S. PATENT DOCUMENTS

| 8,676,530 | B2 | 3/2014 | Roth et al. |
| 9,645,916 | B2 | 5/2017 | Wingfors et al. |
| 10,135,709 | B1* | 11/2018 | Segel ................. G06F 11/30 |

(Continued)

FOREIGN PATENT DOCUMENTS

| CN | 106126431 A | 11/2016 |
| CN | 107807877 A | 3/2018 |

OTHER PUBLICATIONS

Du Chunye et al.; Based on the Analysis of Mobile Terminal Application Software Performance Test; IEEE; pp. 391-394; retrieved on Sep. 7, 2021 (Year: 2017).*

(Continued)

*Primary Examiner* — S. Sough
*Assistant Examiner* — Cuong V Luu
(74) *Attorney, Agent, or Firm* — Caleb D. Wilkes

(57) ABSTRACT

Embodiments generally relate to performance testing of software code. In some embodiments, a method includes executing a software program, where the software program includes at least one target portion of code to be performance tested. The method further includes receiving a data stream, where the data stream includes a plurality of events, and where the at least one target portion of code processes the plurality of events based on an event rate. The method further includes monitoring for failures associated with the at least one target portion of code processing the plurality of events. The method further includes modifying the event rate if at least one failure is detected, where the event rate is modified until no failures are detected. The method further includes generating a performance report if no failures are detected during a target success time period.

19 Claims, 5 Drawing Sheets

(56) References Cited

U.S. PATENT DOCUMENTS

| | | |
|---|---|---|
| 2007/0156375 A1 | 7/2007 | Meier et al. |
| 2016/0306613 A1 | 10/2016 | Busi et al. |
| 2019/0250979 A1* | 8/2019 | Stolfo .................. G06F 11/079 |
| 2019/0377663 A1* | 12/2019 | Szerenyi ............. G06F 11/3672 |
| 2020/0183812 A1* | 6/2020 | Eberlein ............. G06F 11/3664 |

OTHER PUBLICATIONS

Yasmina Amara et al.; Using the SSAV model to evaluate Business Intelligence Software; Journal of Intelligence Studies; 13 pages; retrieved on Sep. 7, 2021 (Year: 2012).*

Avritzer, Alberto, et al., "Software performance testing based on workload characterization", Proceedings of the 3rd international workshop on Software and performance, pp. 17-24, Jul. 2002.

Denaro, Giovanni, et al., "Early Performance Testing of Distributed Software Applications", WOSP '04 Proceedings of the 4th international workshop on Software and performance, pp. 94-103, Jan. 2004.

\* cited by examiner

ADAPTIVE PERFORMANCE CALIBRATION FOR CODE

BACKGROUND

Software performance testing is generally used to test the responsiveness and stability of software code under a particular workload. Software performance testing may also measure reliability, usage, and scalability of software code. Completion of performance testing is time consuming, and even more so when hardware capabilities of a system are unknown. During performance testing in applications where the incoming data load is variable (e.g., no upper limit of incoming data), determining the upper limit of performance for a given coding class or process requires a great deal of time, exploration, and monitoring.

SUMMARY

Disclosed herein is a method for performance testing of software code, and system and a computer program product as specified in the independent claims. Embodiments are given in the dependent claims. Embodiments can be freely combined with each other if they are not mutually exclusive.

In an embodiment, a method includes executing a software program, where the software program includes at least one target portion of code to be performance tested. The method further includes receiving a data stream, where the data stream includes a plurality of events, and where the at least one target portion of code processes the plurality of events based on an event rate. The method further includes monitoring for failures associated with the at least one target portion of code processing the plurality of events. The method further includes modifying the event rate if at least one failure is detected, where the event rate is modified until no failures are detected. The method further includes generating a performance report if no failures are detected during a target success time period.

In another embodiment, the method further includes sending event information associated with one or more of the events of the plurality of events to a security information event and management (STEM) system. In another aspect, the at least one processor further performs operations comprising monitoring for parsing failures. In another aspect, to modify the event rate, the at least one processor further performs operations comprising decreasing the event rate by a predetermined amount. In another aspect, to modify the event rate, the at least one processor further performs operations comprising increasing the event rate by a predetermined amount. In another aspect, the at least one processor further performs operations comprising increasing the event rate by a predetermined amount if no failures are detected during a target stabilization period. In another aspect, the performance report comprises one or more of failure information and event rate information.

DETAILED DESCRIPTION

Embodiments described herein facilitate performance testing of executable software. A system automatically, without user invention, performs adaptive performance calibration of the software based on the performance of a particular portion or code block of the software. In various embodiments, the system explores and determines the upper performance limit of the code block being performance tested. The system monitors for failures associated with the code block, adjusts the throughput (e.g., event rate) to a higher target throughput or to a lower target throughput as needed in order to maximize the throughput while avoiding future failure.

In various embodiments, a system receives a data stream, where the data stream includes events, and where a code block processes the events based at least in part on an event rate. The system monitors for failures associated with the code block as the code block processes the events. The system modifies the event rate if at least one failure is detected, and continues to modify the event rate until no failures are detected. The system further generates a performance report if no failures are detected during a target success time period.

Figure 1:
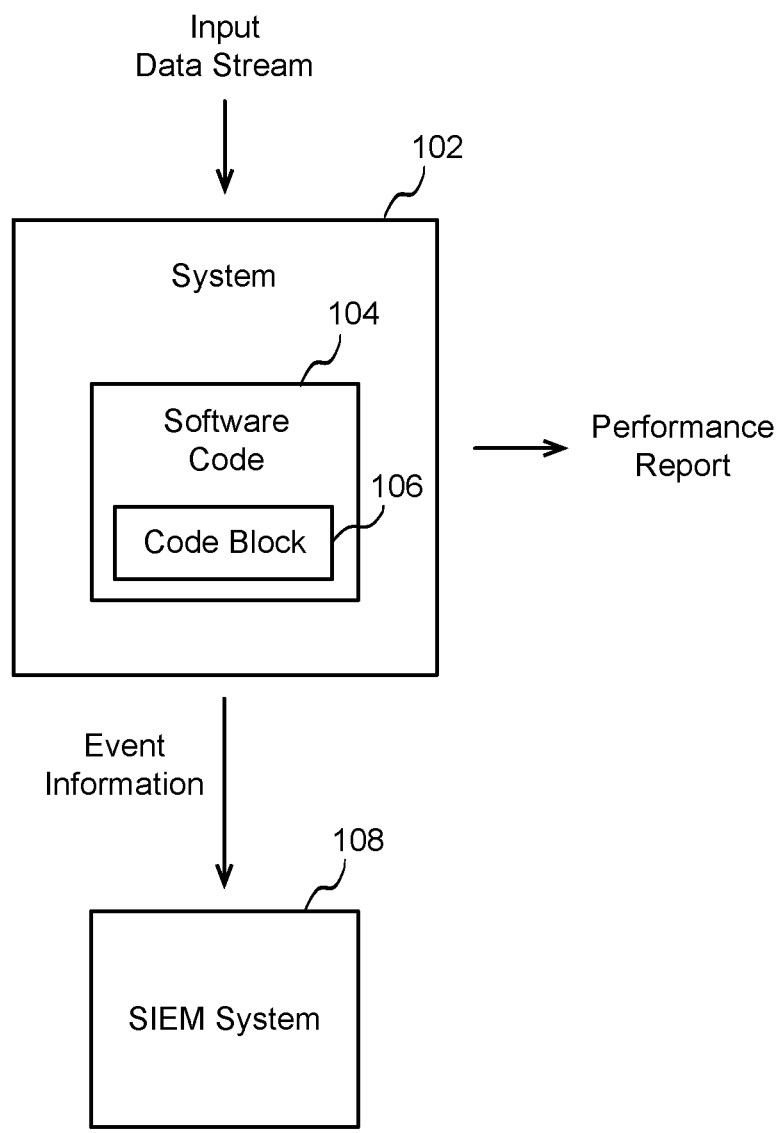
FIG. 1 is a block diagram of an example performance testing environment, which may be used for some implementations described herein.

FIG. 1 is a block diagram of an example performance testing environment 100, which may be used for some implementations described herein. In some implementations, environment 100 includes a system 102, which executes one or more software applications such as software code 104. Software code 104 includes code block 106 among other blocks of code.

In various embodiments, system 102 receives an input data stream, including events. In various embodiments, an event is a textual representation of some action that occurred on a remote system or related to something the remote system is monitoring. Such text may be largely unformatted or may follow one of various structured data formats such as extensible markup language (XML) or JavaScript object notation (JSON), etc. In various embodiments, events may include logs, for example. In a large enterprise environment, the system may receive thousands of events (e.g., logs, etc.) at once, and from multiple sources. For example, the system may receive events from network firewalls, routers, switches, etc. The system may also receive events from operating systems (e.g., Windows or Linux operating systems), intrusion detection systems, or various other types of Security and other systems.

The system parses the events and sends event information associated with one or more of the events to another system such as a security information event and management (SIEM) system 108. In some embodiments, the information that is sent to a SIEM system may contain various details associated with the source and destination internet protocol (IP) address of the event, related user names, timestamps, the action that occurred, various other device specific metadata, etc.

In various embodiments, system 102 may communicate with SIEM system 108 via wired and/or wireless connections associated with any suitable network or combination of networks. System 102 sends events on demand at a particular target event rate (e.g., events per second) towards products such as a SIEM product. Also, system 102 sends events to the products for a predefined amount of time, which is referred to as a target success time.

In some embodiments, the system accesses an underlying management interface that monitors different aspects of code execution, which may include functions performed by a particular block of code, such as code block 106. Code block 106 may, for example, perform particular functions while system 102 monitors and tests the performance of code block 106 related to the parsing queue, controlling the speed of parsing, etc. The management interface may test and monitor multiple STEM devices simultaneously. An example management interface may be, for example, a Java virtual machine (JVM) managed beans (MBeans) interface, or any other similar system management server. A JVM is a virtual machine that enables a system to run Java programs, as well as programs written in other languages that are also compiled to Java code. The interface is capable of simultaneously testing and monitoring multiple devices, such as STEM devices.

As described in more detail herein, system 102 may execute a performance test on any given block or blocks of code, such as code block 106. Code block 106 may be, for example, code that performs parsing of incoming data including events, and extracting, from the events, event information to be sent to other systems such as STEM system 108. As described in more detail herein, system 102 processes events at a particular event rate (e.g., events per second).

In various embodiments, system 102 tests the upper and lower thresholds of code block 106 when used in a production environment. System 102 executes such test by modifying the event rate (e.g., decreasing and/or increasing the event rate) in order to measure various performance aspects such as failure rate, upper threshold, and lower threshold, etc. Further embodiments directed to the performance testing of code are described in more detail herein.

While implementations are described herein in the context of a single block of code being performance tested, these implementations also apply to multiple, different blocks of code of the same software. For example, a release of a software update may include at least one new or modified code block. The system not only ensures that the code block functions properly, but the system also determines the highest throughput capable of the code block. This ensures that the latest version of software has improved performance over the previous version of software.

The system determines the target event rate, which is number of events per second. The system indicates how many events a particular code block can handle and not fail (e.g., can support up to 50K events per second). The system may also determine the performance of the code block for each event rate.

For ease of illustration, FIG. 1 shows one block for each of system 102, software code 104, code block 106, and STEM system 108. Blocks 102, 104, 106, and 108 may represent multiple systems, software code, code blocks, and STEM systems. In other implementations, environment 100 may not have all of the components shown and/or may have other elements including other types of elements instead of, or in addition to, those shown herein.

Figure 2:
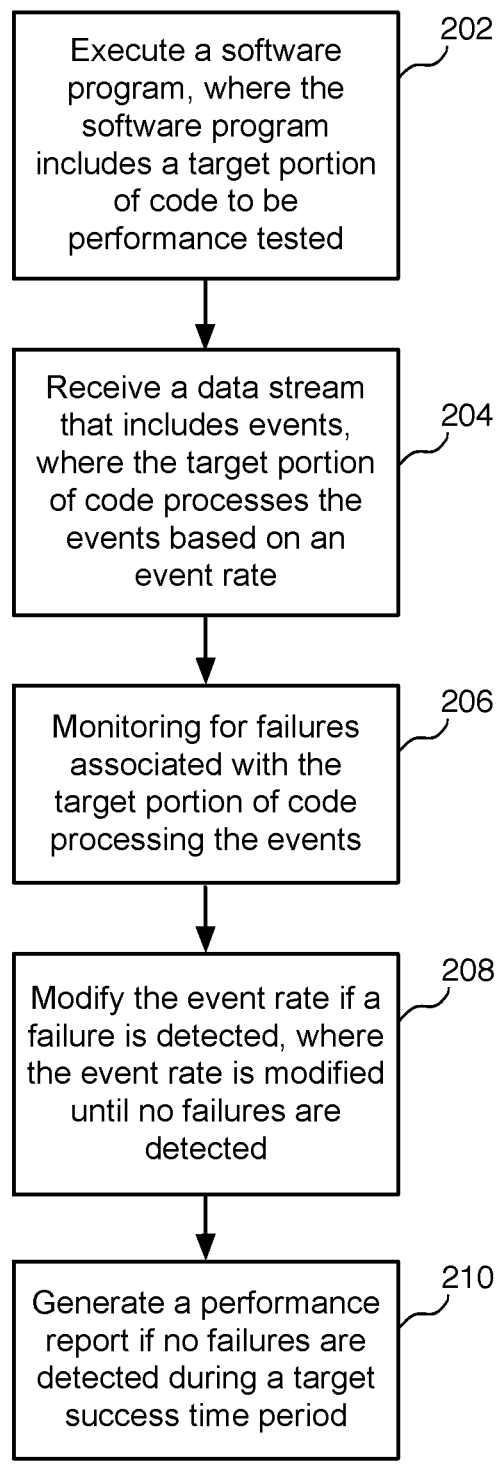
FIG. 2 is an example flow diagram for performance testing of software code, according to some embodiments.

FIG. 2 is an example flow diagram for performance testing of software code, according to some embodiments. As described in more detail herein, the system executes adaptive performance calibration of software based on the performance of a particular portion or code block of the software. In various embodiments, the system explores and determines the upper performance limit of the code block being performance tested.

Referring to both FIGS. 1 and 2, a method begins at block 202, where a system such as system 102 executes a software program such as software code 104. As indicated above, the software program includes at least one target portion of code such as code block 106 to be performance tested.

At block 204, the system receives a data stream. In various scenarios, the rate of the incoming data stream may vary. Also, the rate of the incoming data stream may have no upper limit. For example, as indicated above, the system may receive thousands of events at once.

In various embodiments, the data stream includes incoming events such as logs, and the events may be received from multiple different systems. As indicated above, the target portion of code processes the events based on an event rate, which is the number of events per second.

At block 206, the system monitors for failures. As described in more detail herein, failures may occur when the amount of data processed reaches a particular throughput threshold of the software program. More particularly, failures may be associated with the target portion of code processing the events. In some embodiments, the system may monitor for parsing failures, as well as for other types failures. The particular type of failure or failures may vary, depending on the particular implementation. For example, failures may also include unknown parsed events, the filling of the parsing queue, and other types of errors. In various embodiments, the system detects failures at the output of the software program that occur in connection with the particular code block being performance tested.

At block 208, the system modifies the event rate if at least one failure is detected. The event rate at which no failures are detected may be referred to as the upper limit of performance of the code block. In various embodiments, the initial event rate may vary, and the particular initial even rate will depend on the particular implementation. As described in more detail herein, the system may also modify the event rate until no failures are detected. For example, in various embodiments, the system may incrementally decrease the event rate by a predetermined amount until no failures are detected. Various embodiments directed to the system decreasing the event rate are described in more detail herein.

In various embodiments, the system may increase the event rate by a predetermined amount if some scenarios where the system detects no failures. The system incrementally increases the event rate in order to explore the upper limit of performance of the block of code being performance tested. As indicated above, the event rate at which no failures are detected may be referred to as the upper limit of performance of the code block. In some embodiments, the system may increase the event rate by a predetermined amount if no failures are detected during a target stabilization period. Various embodiments directed to the system increasing the event rate are described in more detail herein.

At block 210, the system generates a performance report if no failures are detected during a target success time period. Information pertinent to the execution of the performance testing is parsed out and placed into an organized and time stamped log file specific to the testing run. The system may access information from the log file for the testing run and include the information in the performance report.

In various embodiments, the performance report includes one or more of failure information and event rate information. For example, the performance report may include parsing failures, new target event rates, sudden significantly large increases in parsing queue size, and/or other relevant messages from the events, etc. The performance report indicates an extent of scalability of the code block being tested. In various embodiments, each portion of code or code block that is performance tested has its own dedicated performance report.

Figure 3:
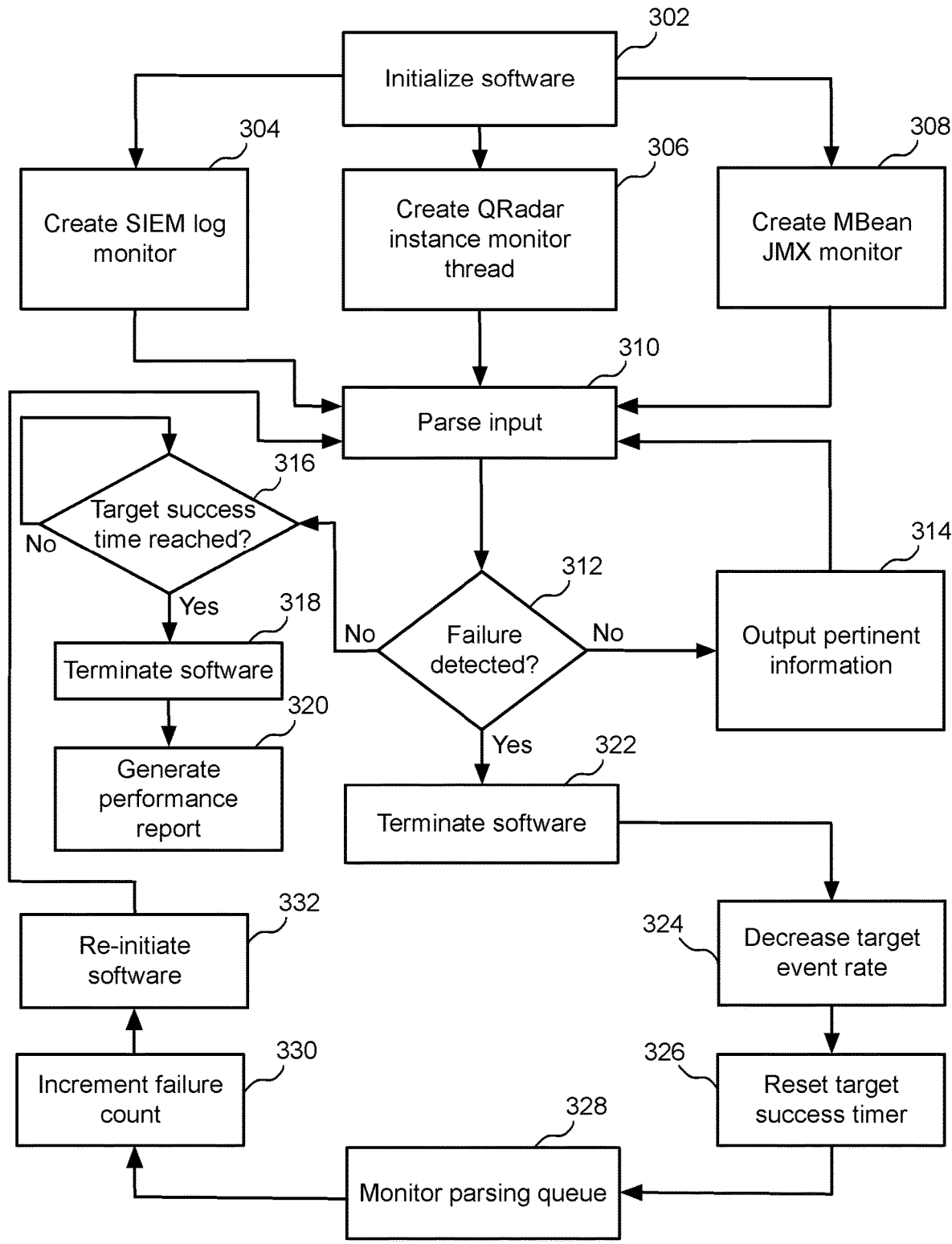
FIG. 3 is an example flow diagram for decreasing an event rate, according to some embodiments.

FIG. 3 is an example flow diagram for decreasing an event rate, according to some embodiments. As described in more detail herein, the system incrementally decreases the event rate until no errors are detected during a target success time. Referring to both FIGS. 1 and 3, a method begins at block 302, where a system initializes the software program. During initialization, the system receives parameters such as which code block is to be tested, the event destination (e.g., product IP address), etc. The system may receive information such as specific parameters from other devices found on the same network as the system. These devices forward the events including parameters that may be informed by event metadata to the system to a specific port.

At block 304, the system creates a log monitor (e.g., a STEM log monitor). In various embodiments, the log monitor accesses and monitors incoming logs and/or other information associated with input data received.

At block 306, the system generates a monitor thread (e.g., QRadar instance monitor thread). In various embodiments, the monitor thread manages and controls the event rate, which is the number of events (e.g., logs) processed per second.

At block 308, the system generates a monitoring server/service (e.g., an MBean Java management extension (JMX) monitor). The monitoring server/service is used to provide metadata regarding a set of measurable parameters that are recorded in set intervals. In various embodiments, the monitoring server/service such as the MBean JMX monitor, determines if any failures occur in connection with the code block being performance tested. The monitoring server/service also determines how many times something fails, the average event rates coming from the code block, and readouts in real time. The monitoring server/service also compares current performance metrics to previous performance metrics.

At block 310, the system parses the input. The parsed input includes input from blocks 304, 306, and 308. Such input includes performance information such as the event rate, detected failures associated with the code block being tested, frequency of failures, etc.

At block 312, the system determines if a failure is detected. In some embodiments, such failures may include, for example, incoming events that cause the code block to throw an exception; incoming events that fill up a parsing queue waiting to enter the code block; and/or events that are unidentified by the code block, etc. If no failures are detected, the system continues to block 314 and to block 316. If a failure is detected, the system continues to block 322. In various embodiments, the system determines if an error had occurred by comparing input to previous values. In various embodiments, the system may compare the incoming event rate (EPS) from this observation to the last; may compare the parsing queue size in the same manner; and/or may compare thrown exceptions in the same manner.

At block 314, if the system does not detect any errors, the system outputs pertinent information. In some embodiments, such information may include information output during a run, which may include an average event parse time, an average event rate, and/or a parsing queue current size, all of which may be sent to console and graphing. Additionally, in some embodiments, messages related to the code block from the system log files may be output to a console and run specific logging. The system then continues to block 310.

At block 316, the system determines if a predetermined target success time is reached. In various embodiments, the target success time is a predetermined time period required for the test to be executed to provide reasonable certainty in the ability of the code block to maintain its stated/required performance capabilities. In some embodiments, target success time tracking becomes active once an upper threshold is identified and the EPS values being sent to the system are near that threshold. A Typical target success time may be one to two hours, for example. Any errors causing the EPS rate to be lowered would reset the target success time. If the target success time is not reached, the system continues to monitor the timer that generates the target success time. If the system does not detect any errors during the target success time (e.g., by the end of the target success time), the system continues to block 318.

At block 318, the system terminates the software program and performance testing. Terminating the software program also terminates the event transmission.

At block 320, the system generates a performance report. As indicated herein, in various embodiments, the performance report may include failure information and event rate information. For example, the performance report may include parsing failures, new target event rates, sudden significantly large increases in parsing queue size, and/or other relevant messages from the events, etc.

At block 322, if the system detects an error the system terminates the software program and performance testing. The system continues to cycle through the flow as shown in FIG. 3 until the system detects no errors by the end of the target success time.

At block 324, the system decreases the event rate by a predetermined percentage of the previous event rate (e.g., the event rate before terminating the performance test). For example, in some implementations, the system may decrease the event rate to 95% of the previous event rate. In some implementations, the target event rate may be adjusted by sending a command to an external script, which controls the flow of test events into the code block. In this scenario, the system may first stop all processes sending events, wait until the rate is back to zero in order to be certain that the starting number being sent is the true EPS rate. Then, the system begins sending them back in again by sending a second command to the external script.

At block 326, the system resets the target success timer. Resetting the target success timer restarts the target success time.

At block 328, the system monitors the parsing queue until the parsing queue is empty. In various embodiments, the system may wait until the monitoring server (e.g., JMX) reports it is not receiving any more events. This means that the parsing queue (a buffer) within the code block has been completely emptied and there is no chance that previous tests will interfere with the new EPS the system is about to send.

At block 330, the system increments the failure count. In various embodiments, the system includes the failure count (e.g., in the performance report).

At block 332, the system re-initiates the software based on the new event rate, and continues with the performance test process. In various embodiments, the new event rate becomes the new baseline. The system then continues to block 310.

Figure 4:
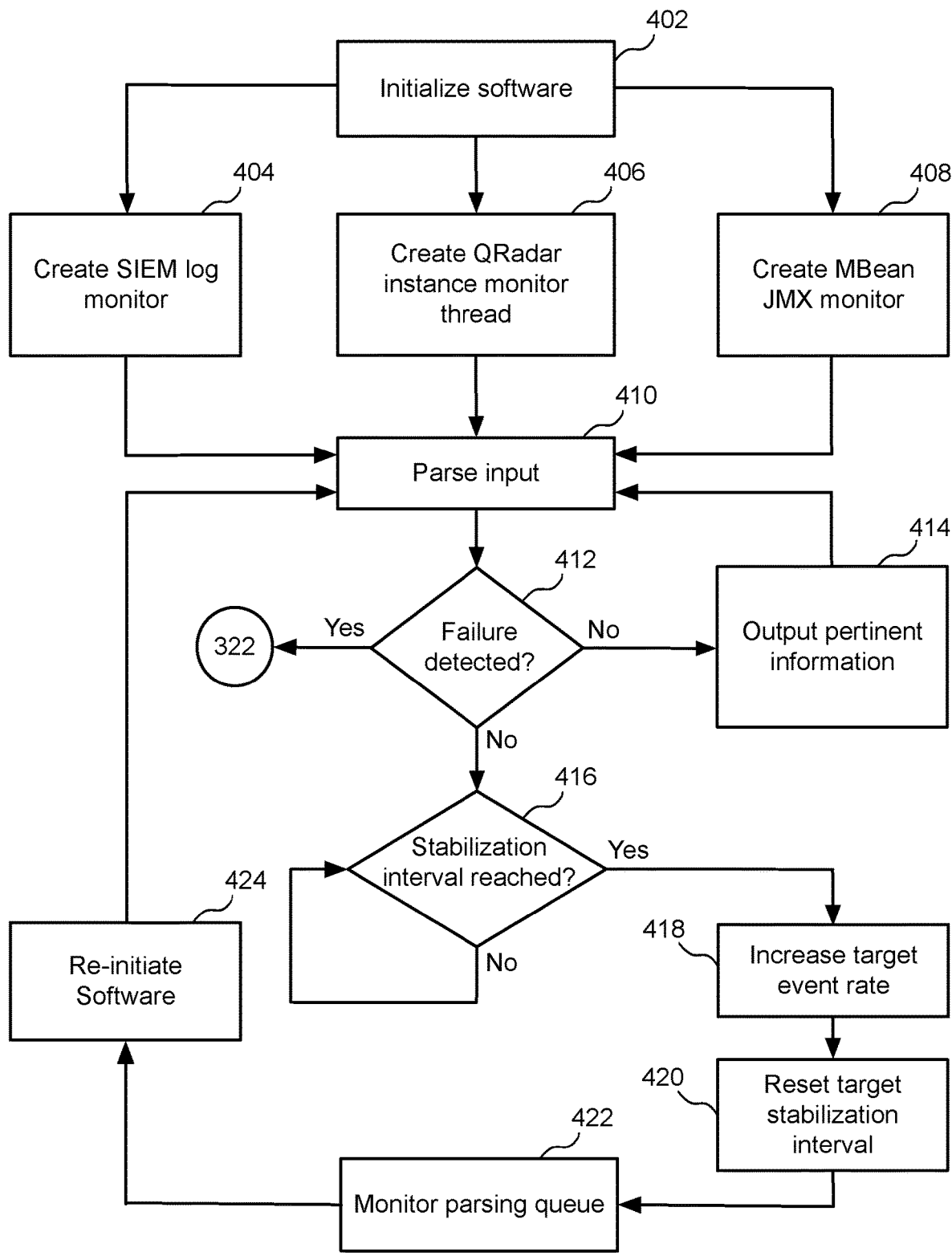
FIG. 4 is an example flow diagram for increasing an event rate, according to some embodiments.

FIG. 4 is an example flow diagram for increasing an event rate, according to some embodiments. As described in more detail herein, the system incrementally increases the event rate until one or more errors are detected. This determines the true upper performance limit that the code block is capable of. Referring to both FIGS. 1 and 3, a method begins at block 402, where a system initializes the software program. During initialization, the system receives parameters such as which code block is to be tested, the event destination (e.g., product IP address), etc.

At block 404, the system creates a log monitor (e.g., a SIEM log monitor). In various embodiments, the log monitor accesses and monitors incoming logs and/or other information associated with input data received.

At block 406, the system generates a monitor thread (e.g., QRadar instance monitor thread). In various embodiments, the monitor thread manages and controls the event rate, which is the number of events (e.g., logs) processed per second.

At block 408, the system generates an MBean Java management extension (JMX) monitor. In various embodiments, the MBean JMX monitor determines if any failures occur in connection with the code block being performance tested. The MBean JMX monitor also determines how many times something fails, the average event rates coming from the code block, and readouts in real time. The MBean JMX monitor also compares current performance metrics to previous performance metrics.

At block 410, the system parses the input. The parsed input includes input from blocks 404, 406, and 408. Such input includes performance information such as the event rate, detected failures associated with the code block being tested, frequency of failures, etc.

At block 412, the system determines if a failure is detected. If no failures are detected, the system continues to block 414 and to block 416. If a failure is detected, the system continues to block 322 of FIG. 3.

In various embodiments, the system determines if an error had occurred by comparing input to previous values.

At block 414 if the system does not detect any errors, the system outputs pertinent information. The system then continues to block 410 to continue receiving information from blocks 404, 406, and 408.

At block 416, the system determines if no errors are detected during a target stabilization interval, and arrives at a stable performance value close to the true limit of the code. In various embodiments, the target stabilization interval is a predetermined time period in which the system explores the upper performance threshold of a code block. If no errors are observed within this time frame, there is reasonable certainty that the system can increase the EPS rate further. The target stabilization rate is repeated until errors are observed within a given repetition. The system may then drop the EPS rate (e.g., by 5%) and begin the target success time observations. Target stabilization intervals begin with the start of testing. A Typical target stabilization interval may be ten to fifteen minutes, for example. As described above, if an error is encountered during an iteration of the target stabilization rate, the system may drop the EPS by 5% and begin the target success time observation. If the system detects one or more errors during the target stabilization interval, the system continues to monitor for errors until the system detects no errors during the predetermined stabilization interval. If the system does not detect any errors during the predetermined stabilization interval, the system continues to block 418.

At block 418, the system increases the target event rate by a predetermined percentage of the previous target event rate (e.g., the target event rate before the stabilization interval was achieved). For example, in some implementations, the system may increase the event rate to 105% of the previous target event rate. As the system incrementally increases the event rate, the event rate will eventually hit the upper limit (breaking point), where a failure occurs.

At block 420, the system resets the target stabilization interval.

At block 422, the system monitors the parsing queue until the parsing queue is empty.

At block 424, the system re-initiates the software based on the new event rate, and continues with the performance test process. In various embodiments, the new event rate becomes the new baseline. The system then continues to block 410.

As indicated above, the system increases the event rate until one or more errors are detected, which determines the true upper performance limit that the code block is capable of. In various implementations, once first failure is detected, the system may then incrementally decrease the event rate until no failures occur.

Figure 5:
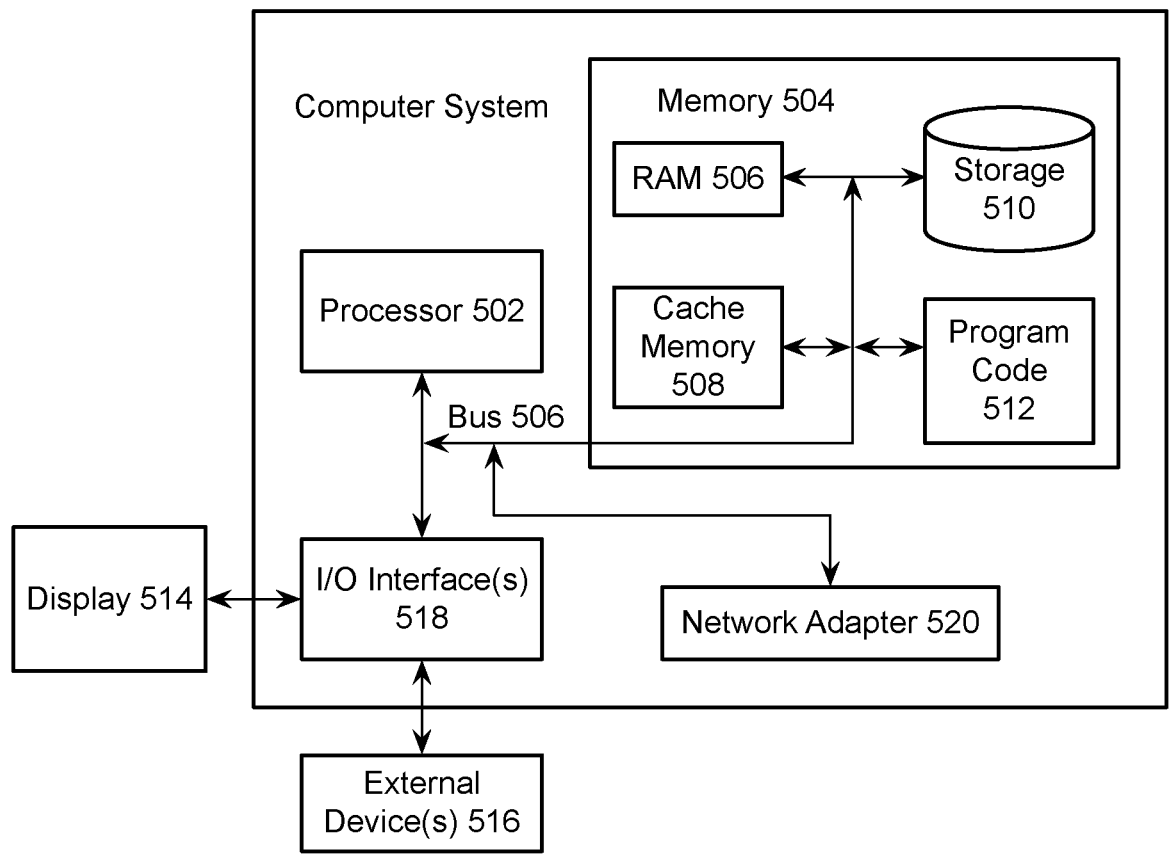
FIG. 5 is a block diagram of an example computer system, which may be used for embodiments described herein.

FIG. 5 is a block diagram of an example computer system 500, which may be used for embodiments described herein. For example, computer system 500 may be used to implement system 102 of FIG. 1, as well as to perform embodiments described herein. Computer system 500 is operationally coupled to one or more processing units such as processor 502, a memory 504, and a bus 506 that couples to various system components, including processor 502 and memory 504. Bus 506 represents one or more of any of several types of bus structures, including a memory bus, a memory controller, a peripheral bus, an accelerated graphics port, a processor or local bus using any of a variety of bus architectures, etc. Memory 504 may include computer readable media in the form of volatile memory, such as a random access memory (RAM) 506, a cache memory 508, and a storage unit 510, which may include non-volatile storage media or other types of memory. Memory 504 may include at least one program product having a set of at least one program code module such as program code 512 that are configured to carry out the functions of embodiments described herein when executed by processor 502. Computer system 500 may also communicate with a display 514 or one or more other external devices 516 via input/output (I/O) interface(s) 518. Computer system 500 may also communicate with one or more networks via network adapter 520. In other implementations, computer system 500 may not have all of the components shown and/or may have other elements including other types of elements instead of, or in addition to, those shown herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
at least one processor and a computer readable storage medium having program instructions embodied therewith, the program instructions executable by the at least one processor to cause the at least one processor to perform operations comprising:

initiating an execution of a software program for a first performance test, wherein the software program includes at least one target portion of code to be performance tested;

starting a timer for the first performance test for a predetermined target success time;

receiving a first data stream, wherein the first data stream includes a first plurality of events, and wherein the at least one target portion of code processes the first plurality of events based on an event rate;

monitoring for first failures associated with the at least one target portion of code processing the first plurality of events;

detecting a first failure associated with the at least one target portion of code during the predetermined target success time for the first performance test; and in response to detecting the first failure:
   terminating the execution of the software program and the first performance test prior to an expiration of the predetermined target success time for the first performance test;
   resetting and restarting the timer for a second performance test for the predetermined target success time;
   decreasing the event rate by a predetermined amount, the decreasing comprising:
      sending a first command to an external script to stop a flow of events and decrease the event rate, and
      sending a second command to the external script to restart the flow of events after the event rate is back to zero;
   reinitiating the execution of the software program for the second performance test;
   receiving a second data stream, wherein the second data stream includes a second plurality of events, and wherein the at least one target portion of code processes the second plurality of events based on the decreased event rate; and
   monitoring for second failures associated with the at least one target portion of code processing the second plurality of events;

wherein the first failure and the second failures are selected from a group consisting of:
   one or more events that cause the at least one target portion of code to throw an exception,
   one or more incoming events that fill up a parsing queue waiting to enter the at least one target portion of code, and
   one or more events that are unidentified by the at least one target portion of code.

2. The system of claim 1, wherein the operations further comprise sending event information associated with one or more events of the first plurality of events to a security information event and management (SIEM) system.

3. The system of claim 1, wherein the operations further comprise monitoring for parsing failures.

4. The system of claim 1, wherein the operations further comprise:
in response to detecting a second failure associated with the at least one target portion of code during the predetermined target success time for the second performance test:
   terminating the execution of the software program and the second performance test prior to an expiration of the predetermined target success time for the second performance test;
   further decreasing the event rate by the predetermined amount;
   resetting and restarting the timer for a third performance test for the predetermined target success time;
   reinitiating the execution of the software program for the third performance test;
   receiving a third data stream, wherein the third data stream includes a third plurality of events, and wherein the at least one target portion of code processes the third plurality of events based on the further decreased event rate; and
   monitoring for third failures associated with the at least one target portion of code processing the third plurality of events until a third failure is detected during the predetermined target success time for the third performance test or until no failures are detected during the predetermined target success time for the third performance test.

5. The system of claim 4, wherein the monitoring for third failures associated with the at least one target portion of code processing the third plurality of events occurs until no failures are detected during the predetermined target success time for the third performance test, and
wherein the operations further comprise:
   in response to no failures being detected during the predetermined target success time for the third performance test, outputting, to a console, messages related to the at least one target portion of code from system log files and running specific logging.

6. The system of claim 1, wherein the operations further comprise:
in response to detecting no failures during the predetermined target success time for the second performance test:
   terminating the execution of the software program at an expiration of the predetermined target success time for the second performance test;
   increasing the event rate by a second predetermined amount;
   resetting and restarting the timer for a third performance test for the predetermined target success time;
   reinitiating the execution of the software program for the third performance test;
   receiving a third data stream, wherein the third data stream includes a third plurality of events, and wherein the at least one target portion of code processes the third plurality of events based on the further increased event rate; and
   monitoring for third failures associated with the at least one target portion of code processing the third plurality of events until no failures are detected during the predetermined target success time for the third performance test or until a third failure is detected during the predetermined target success time for the third performance test.

7. The system of claim 1, wherein the terminating the execution of the software program and the first performance test comprises emptying a parsing queue associated with the first performance test.

8. The system of claim 1, wherein the monitoring for failures associated with the at least one target portion of code processing the second plurality of events comprises:

comparing input from the second plurality of events to input from the first plurality of events.

9. The system of claim 1, wherein the operations further comprise parsing input from a security information event and management system, from a monitor thread, and from a metadata-generating monitor server.

10. A computer program product comprising a computer readable storage medium having program instructions embodied therewith, the program instructions executable by at least one processor to cause the at least one processor to perform operations comprising:
- initiating an execution of a software program for a first performance test, wherein the software program includes at least one target portion of code to be performance tested;
- starting a timer for the first performance test for a predetermined target success time;
- receiving a first data stream, wherein the first data stream includes a first plurality of events, and wherein the at least one target portion of code processes the first plurality of events based on an event rate;
- monitoring for first failures associated with the at least one target portion of code processing the first plurality of events;
- detecting a first failure associated with the at least one target portion of code during the predetermined target success time for the first performance test; and
- in response to detecting the first failure:
  - terminating the execution of the software program and the first performance test prior to an expiration of the predetermined target success time for the first performance test;
  - resetting and restarting the timer for a second performance test for the predetermined target success time;
  - decreasing the event rate by a predetermined amount, the decreasing comprising:
    - sending a first command to an external script to stop a flow of events and decrease the event rate, and
    - sending a second command to the external script to restart the flow of events after the event rate is back to zero;
  - reinitiating the execution of the software program for the second performance test;
  - receiving a second data stream, wherein the second data stream includes a second plurality of events, and wherein the at least one target portion of code processes the second plurality of events based on the decreased event rate; and
  - monitoring for second failures associated with the at least one target portion of code processing the second plurality of events,
- wherein the first failure and the second failures are selected from a group consisting of:
  - one or more events that cause the at least one target portion of code to throw an exception,
  - one or more incoming events that fill up a parsing queue waiting to enter the at least one target portion of code, and
  - one or more events that are unidentified by the at least one target portion of code.

11. The computer program product of claim 10, wherein the operations further comprise sending event information associated with one or more events of the first plurality of events to a security information event and management (SIEM) system.

12. The computer program product of claim 10, wherein the operations further comprise monitoring for parsing failures.

13. The computer program product of claim 10, wherein the operations further comprise:
- in response to detecting a second failure associated with the at least one target portion of code during the predetermined target success time for the second performance test:
  - terminating the execution of the software program and the second performance test prior to an expiration of the predetermined target success time for the second performance test;
  - further decreasing the event rate by the predetermined amount;
  - resetting and restarting the timer for a third performance test for the predetermined target success time;
  - reinitiating the execution of the software program for the third performance test;
  - receiving a third data stream, wherein the third data stream includes a third plurality of events, and wherein the at least one target portion of code processes the third plurality of events based on the further decreased event rate; and
  - monitoring for third failures associated with the at least one target portion of code processing the third plurality of events until a third failure is detected during the predetermined target success time for the third performance test or until no failures are detected during the predetermined target success time for the third performance test.

14. The computer program product of claim 10, wherein the operations further comprise:
- in response to detecting no failures during the predetermined target success time for the second performance test:
  - terminating the execution of the software program at an expiration of the predetermined target success time for the second performance test;
  - increasing the event rate by a second predetermined amount;
  - resetting and restarting the timer for a third performance test for the predetermined target success time;
  - reinitiating the execution of the software program for the third performance test;
  - receiving a third data stream, wherein the third data stream includes a third plurality of events, and wherein the at least one target portion of code processes the third plurality of events based on the further increased event rate; and
  - monitoring for third failures associated with the at least one target portion of code processing the third plurality of events until no failures are detected during the predetermined target success time for the third performance test or until a third failure is detected during the predetermined target success time for the third performance test.

15. A computer-implemented method for performance testing of software code, the method comprising:
- initiating an execution of a software program for a first performance test, wherein the software program includes at least one target portion of code to be performance tested;
- starting a timer for the first performance test for a predetermined target success time;
- receiving a first data stream, wherein the first data stream includes a first plurality of events, and wherein the at least one target portion of code processes the first plurality of events based on an event rate;

monitoring for first failures associated with the at least one target portion of code processing the first plurality of events;

detecting a first failure associated with the at least one target portion of code during the predetermined target success time for the first performance test; and in response to detecting the first failure:
  terminating the execution of the software program and the first performance test prior to an expiration of the predetermined target success time for the first performance test;
  resetting and restarting the timer for a second performance test for the predetermined target success time;
  decreasing the event rate by a predetermined amount, the decreasing comprising:
    sending a first command to an external script to stop a flow of events and decrease the event rate, and
    sending a second command to the external script to restart the flow of events after the event rate is back to zero;
  reinitiating the execution of the software program for the second performance test;
  receiving a second data stream, wherein the second data stream includes a second plurality of events, and wherein the at least one target portion of code processes the second plurality of events based on the decreased event rate; and
  monitoring for second failures associated with the at least one target portion of code processing the second plurality of events,
  wherein the first failure and the second failures are selected from a group consisting of:
    one or more events that cause the at least one target portion of code to throw an exception,
    one or more incoming events that fill up a parsing queue waiting to enter the at least one target portion of code, and
    one or more events that are unidentified by the at least one target portion of code.

16. The method of claim 15, further comprising sending event information associated with one or more events of the first plurality of events to a security information event and management (SIEM) system.

17. The method of claim 15, further comprising monitoring for parsing failures.

18. The method of claim 15, further comprising:
in response to detecting a second failure associated with the at least one target portion of code during the predetermined target success time for the second performance test:
  terminating the execution of the software program and the second performance test prior to an expiration of the predetermined target success time for the second performance test;
  further decreasing the event rate by the predetermined amount;
  resetting and restarting the timer for a third performance test for the predetermined target success time;
  reinitiating the execution of the software program for the third performance test;
  receiving a third data stream, wherein the third data stream includes a third plurality of events, and wherein the at least one target portion of code processes the third plurality of events based on the further decreased event rate; and
  monitoring for third failures associated with the at least one target portion of code processing the third plurality of events until a third failure is detected during the predetermined target success time for the third performance test or until no failures are detected during the predetermined target success time for the third performance test.

19. The method of claim 15, further comprising:
in response to detecting no failures during the predetermined target success time for the second performance test:
  terminating the execution of the software program at an expiration of the predetermined target success time for the second performance test;
  increasing the event rate by a second predetermined amount;
resetting and restarting the timer for a third performance test for the predetermined target success time;
  reinitiating the execution of the software program for the third performance test;
  receiving a third data stream, wherein the third data stream includes a third plurality of events, and wherein the at least one target portion of code processes the third plurality of events based on the further increased event rate; and
  monitoring for third failures associated with the at least one target portion of code processing the third plurality of events until no failures are detected during the predetermined target success time for the third performance test or until a third failure is detected during the predetermined target success time for the third performance test.

* * * * *